(12) United States Patent  
Wang et al.

(10) Patent No.: US 11,455,874 B2  
(45) Date of Patent: Sep. 27, 2022

(54) ELECTRICAL ALARM AND METHODS OF MAKING AND USING THE ALARM

(71) Applicant: Hangzhou Timing Security Technologies Co., Ltd., Hangzhou (CN)

(72) Inventors: Lin Wang, Hangzhou (CN); Peter Morello, Sr., Hobe Sound, FL (US); Peter A. Morello, Jr., Stuart, FL (US)

(73) Assignee: Hangzhou Timing Security Technologies Co., Ltd., Hangzhou (CN)

( * ) Notice: Subject to any disclaimer, the term of this patent is extended or adjusted under 35 U.S.C. 154(b) by 0 days.

(21) Appl. No.: 17/485,713

(22) Filed: Sep. 27, 2021

(65) Prior Publication Data

US 2022/0012994 A1    Jan. 13, 2022

Related U.S. Application Data

(63) Continuation of application No. 16/340,261, filed as application No. PCT/US2018/012745 on Jan. 8, 2018, now Pat. No. 11,138,849.

(51) Int. Cl.
| | | |
|---|---|---|
| *G08B 13/14* | (2006.01) | |
| *G08B 13/24* | (2006.01) | |
| *E05B 45/00* | (2006.01) | |
| *E05B 73/00* | (2006.01) | |
| *H01M 50/216* | (2021.01) | |

(52) U.S. Cl.
CPC ........ *G08B 13/2434* (2013.01); *E05B 45/005* (2013.01); *E05B 73/0017* (2013.01); *E05B 73/0029* (2013.01); *E05B 73/0052* (2013.01); *G08B 13/242* (2013.01); *H01M 50/216* (2021.01); *H01M 2220/30* (2013.01)

(58) Field of Classification Search
None  
See application file for complete search history.

(56) References Cited

U.S. PATENT DOCUMENTS

| | | | |
|---|---|---|---|
| 2006/0170550 A1* | 8/2006 | Marsilio | G08B 13/2434 340/568.2 |
| 2015/0020558 A1* | 1/2015 | Williams | G01S 19/16 70/18 |
| 2019/0130714 A1* | 5/2019 | Miettinen | G08B 13/248 |

* cited by examiner

*Primary Examiner* — John F Mortell  
(74) *Attorney, Agent, or Firm* — Peter K. Trzyna, Esq.

(57) ABSTRACT

A security tag including: a housing and circuitry which detects a locked state, the circuitry configured to execute a signal transfer function responsive to interchanging a pin and a lanyard in the circuitry, and/or the housing including a replaceable battery compartment locked by inserting either the pin or the lanyard into a lock mechanism which differently secures the pin and the lanyard; and an alarm, in communication with the circuitry, triggered by an undisarmed breach of the locked state.

22 Claims, 9 Drawing Sheets

ELECTRICAL ALARM AND METHODS OF MAKING AND USING THE ALARM

PRIORITY

The present patent application is a continuation of and incorporates by reference completely as if restated totally herein U.S. patent application Ser. No. 16/340,261, filed Apr. 8, 2019, pending. U.S. patent application Ser. No. 16/340,261 is a 371 of International Application No. PCT/US18/12745, filed Jan. 8, 2018. PCT/US18/12745 claims priority from Chinese patent application filed 9 Jan. 2017: Chinese application No: 2017-01-09; identification numbers: ZL 2017 2 0021692.7.

TECHNICAL FIELD

An electrical apparatus, process for using the apparatus, process for making the apparatus and products produced thereby. The apparatus may be an alarm device, tag, or the like.

TECHNICAL BACKGROUND

The prior art includes U.S. Pat. Nos. 9,711,032 and 9,489,808, which are fully incorporated by reference and which, according to their abstracts, disclose an alarm device and an extension which includes a protrusion. The extension can have wiring, and the alarm device can detect for a change in electricity running through the wiring, such as a change that would occur when the electricity is interrupted when the wiring is cut. The protrusion is located adjacent to the extension, distant from the alarm device, and can include a key, switch, connector, or the like. The protrusion, in some cases, can be releasably connectable to a housing that is in turn connected to the extension, so as to form a loop in which an item can be secured for protection, e.g., from theft.

Various other approaches have been tried, as characterized in the following:

| U.S. Patent Documents | | |
| --- | --- | --- |
| 6,621,415 | September 2003 | Willis |
| 7,212,115 | May 2007 | Fawcett |
| 2007/0146134 | June 2007 | Belden |
| 2007/0164860 | July 2007 | Marsilio |
| 2008/0122579 | May 2008 | German |
| 2012/0019383 | January 2012 | Fawcett |
| 2012/0229975 | September 2012 | Yang |
| 2013/0241731 | September 2013 | Fawcett |

A need nonetheless exists for an alternative or situationally-improved electrical device, security system, alarm, consumer theft-protection apparatus, and the like, particularly for convertible applications.

DISCLOSURE

Generally, there can be an apparatus that convertibly accommodates one of a plurality of different accessories. The apparatus can include a housing and circuitry that detects a locked state. An alarm is triggered by an undisarmed breach of the locked state.

Embodiments are disclosed herein by way of a teaching example. The example is a security tag, though other embodiments need not be limited to a security tag while remaining in keeping with the principles taught herein. In this teaching example, the accessories can, but need not always, be such a pin or a lanyard. The pin and lanyard can be differently secured mechanically, electrically, both, etc. For example, in some embodiments, the circuitry can be configured to execute a signal transfer function responsive to interchanging the accessories so that the accessories are incorporated into the circuitry. The result can be differently shaped circuitry occasioned by the employment of different accessories.

In some embodiments, the accessories can employ a housing that is mechanically locked by inserting one of the accessories into a lock mechanism. For example, the housing can include a battery compartment (or other feature of the housing) secured shut by an inserted accessory. Some embodiments convertibly include both electrically and mechanically distinct ways of securing the accessories, while others are otherwise directed as discussed below.

INDUSTRIAL APPLICABILITY

Industrial applicability is representatively directed to that of electrical devices, security systems, alarms, tags, consumer theft-protection apparatuses, as well as industries operating in cooperation therewith, depending on the implementation.

DRAWINGS

MODES

Figure 1:
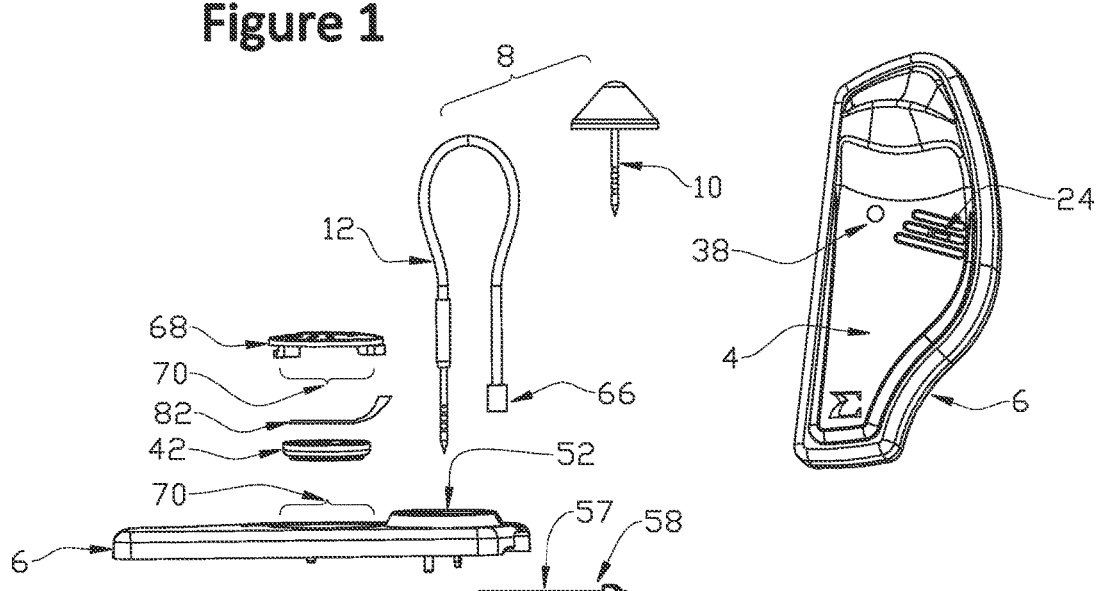
FIG. 1 is an indication of an embodiment represented as a security tag.

In general, depending on the implementation, there can be an apparatus, article of manufacture, process of using the apparatus/article, process of making the apparatus/article, and products produced thereby. Illustratively, for some embodiments, there can be a housing and circuitry that detects a locked state. Accessories can be differently accommodated by the apparatus/article, and the circuitry can, but need not always, be configured to execute a signal transfer function responsive to interchanging the accessories. For example, the accessories can have a conductive connector, such as a pin or a lanyard, that is inserted into the circuitry so as to result in differently shaped circuitry for each of the accessories. In other embodiments, the housing can, but need not always, include a housing, or part thereof (e.g., a battery compartment) locked by inserting one or the other of the accessories. For example, either the pin or the lanyard can be inserted into a lock mechanism that also secures at least some of the housing. In yet other embodiments, there can be both the circuitry configured to execute a signal transfer function responsive to interchanging the accessories and the housing including at least some of the housing being locked by inserting one of the accessories into a lock mechanism that differently secures the accessories, e.g., the pin and the lanyard. In such embodiments, an alarm is triggered by an undisarmed breach of the locked state.

In generally viewing certain embodiments is as an alarm tag device with a function of detecting its locking state, the tag device can include a convertible tag top cover for a printed circuit board (PCB), an alarm element, and a lock embedded within the device, e.g., located under the top cover. Illustrative of the accessories, the pin can be used together with the lock. Illustrative of another of the accessories, the lanyard can be used with the lock, the lanyard having a long pin to insert into the lock. However, unlike the pin, there can be a separate connection to the device for another end of the lanyard.

To enable convertability, for the pin or lanyard and long pin, there can be a first signal transfer spring and a switch spring under the tag top cover. One end of the signal transfer spring can swingably fit to a mandrill hole of the tag top cover, so the signal transfer spring can conduct an electricity signal with the pin or long pin plugged in the mandrill hole, toward the lock. Another end of the switch spring can swingably fit to a heading hole of the tag top cover, so as to disconnect the signal transfer spring as the lanyard is inserted into the heading hole. In either case, the switch spring can conduct an electricity signal with the signal transfer spring with the switch spring, and the lock can conduct electricity with the PCB board. The lock connects its electricity signal to one end of the PCB board by a lock-connecting spring.

The tag top cover can be structured to set a lanyard pin drawer with a lanyard hole and the mandrill hole. The pin drawer can be slidably located with respect to the top cover and lock the battery cover. Accordingly, when the pin or long pin is inserted through the mandrill hole of the tag top cover and of the pin drawer, the pin drawer is held in a fixed or locked position. The other end of the pin drawer accommodates a copper or conductive end of the lanyard allowing the electricity signal to enter the lanyard, traverse the lanyard, and emerge via the lock to the PCB.

In operation, the security tag device will alarm for an undisarmed breach of the locked state, such as when the lock is triggered or the circuit signal is in cut, even when the lock is opened by a lockpick (e.g., magnet). In the alarm tag device, there is the PCB board with an integrated circuit (IC), an alarm element (a buzzer is suggested), and the lock (spherical lock, usually magnetic) for locking the pin or long pin. The pin threads through consumer products (e.g., a sheet structure product, like the clothing) and inserts into the lock so that the product or structure can be protected with the alarm tag. The alarm tag is convertibly equipped, such that the long pin of the lanyard can be interchanged with the pin. One end of the lanyard is fixed on its tail held in the pin drawer, and another end (long pin end) of the lanyard is fixed at the top cover via the lock. In use, the long pin inserts into the lock and is fixed with the top cover, and a loop made by the lanyard can thread to protect its product, e.g., loop through a purse handle. The foregoing embodiments allow one to pin or loop to deter potential theft or tampering.

The tag can employ a signal spring and a switch spring, e.g., under or in the top cover, such that one end of the signal spring can swingably (by resilience) lead into the mandrill hole of the top cover by about 1.0-1.5 mm". This switch spring structure can be finished so that the copper or conductive heading part of the lanyard inserts into its matched hole in the pin drawer, pulling apart one end of the switch spring, so that the switch spring and the signal spring connections are cut. When the copper heading end of the lanyard is removed, one end of the switch spring will resiliently touch the signal transfer spring, so the springs can conduct an electricity signal. Another end of this switch spring can conduct electricity signal with the lock spring or the lock itself. The lock and the switch spring respectively conduct the electricity signal with two electric contacts of the PCB board, such that the signal circuit is shaped differently for the pin and the lanyard/long pin accessories. This is an illustrative teaching of the broader principle of differently shaped circuitry to accommodate different accessories, and this is one manner of enabling the apparatus to convertibly accommodate the different accessories, each in a distinct manner.

As previously mentioned, the convertible top cover or device can slidably locate the lanyard pin drawer, illustrative of an arm or other such means for mechanically securing at least one accessory. In this teaching, there are two holes in the lanyard pin drawer: a first hole for matching the mandrill hole, and another hole for threading the lanyard's conductive end. The axis of the two holes is the same, and the axis parallels with the lanyard pin when in the drawer. On the other end of the lanyard sets its copper or conductive head into its matching hole. The pin drawer can slidably move into a slot of tag top cover or device, with the axis of the lanyard's matching hole perpendicular to the slip direction of the pin drawer. Thus, when the pin drawer is withdrawn into the slot of the tag top cover and the long pin is inserted into the mandrill hole, pulling the lanyard will not let the pin drawer leave the slot.

This alarm tag can apply a replaceable battery in some, but not all, embodiments. For example, when the lanyard pin drawer inserts into the slot of the tag top cover, the pin drawer can lock the battery cover. When the tag is in the working state, the long pin or the pin can be inserted into the tag and into the hole or female receptor in the pin drawer, this step helps to lock the pin drawer.

In operation, in a working state:
1. Using the long pin with lanyard: the PCB with the IC conducts a signal to the conductive heading part of the lanyard, through to another end of long pin to connect to the lock, then through the lock and lock spring to the PCB, and completes the circuit; if the lanyard is cut or pulled apart or separated from the tag, or the lock state is otherwise disrupted (other than by disarming) the alarm elements will alarm. A wireless decoder can turn off the alarm and/or disarm the device and/or enable a standby mode.

2. Using the pin: the PCB with the IC can conduct the signal to the signal transfer spring by the switch spring, and conduct to the lock by the pin, then send the signal back to the PCB board by the lock spring. Pulling apart the pin or separating the pin from the tag, the alarm elements will alarm (other than by disarming). The wireless decoder can turn off the alarm and/or disarm the device and/or enable a standby mode.

In sum, in this general and non-limiting teaching, for some embodiments, there can be circuitry that has a function of detecting its locking state. In a tag implementation, there can be a convertible tag top cover with the PCB board and an alarm element and a lock embedded in or under the top cover, to accommodate a pin (used together with the lock) or the long pin (used to connect the lanyard and co-used with the lock)—both the pin and lanyard being illustrative of different accessories. There can, but need not always, be a signal transfer spring and a switch spring in the tag top cover. One end of the signal transfer spring can swingably fit to a mandrill hole of the tag top cover to conduct an electricity signal with the pin or long pin which is plugged into the mandrill hole. One end of the switch spring can swingably fit to a lanyard conductive end hole of the tag top cover's drawer to disconnect the signal transfer spring as the lanyard's conductive end is inserted into the end hole. In either case, the switch spring can conduct an electricity signal with the signal transfer spring, with the switch spring and the lock, which conducts the electricity signal with the contacts on the PCB board.

In some embodiments, the alarm tag has a function of detecting its locking state and has the features as: the lock connects its electricity signal to one end of the PCB by its connecting spring.

In some embodiments, the alarm tag has alarm tag has a function of detecting its locking state and has the features as: the tag top cover sets the lanyard pin drawer with a lanyard long pin hole and a mandrill hole; this pin drawer can slidably locate at the top cover and, in some implementations, lock the battery cover.

In some embodiments, the alarm tag has alarm tag has a function of detecting its locking state and has the features as: the other end of the lanyard has a suitable copper head matching the lanyard hole on the pin drawer.

More particularly, the drawings illustratively provide a teaching embodiment in which the security apparatus is again being illustratively depicted as a security tag device 1 (FIG. 2 and FIG. 3), though to be clear, this is a teaching for other embodiments as well. In such an embodiment, there can be a housing 2 (FIGS. 2 and 3) that may, but need not always, be comprised of two pieces—top 4 and bottom 6 to collectively prescribe a compartment within the housing 2. Top 4 and bottom 6 may be joined by a weld, glue, etc. The housing 2 cooperates with interchangeable accessories 8, which are illustrated in the FIGS. 2 and 3, etc. as a pin 10 and lanyard 12, recognizing that other accessories can be used, as discussed below. That is, because the accessories at issue depend on implementation desired, pin 10 and lanyard 12 are illustrative in this teaching embodiment. So as an example, pin 4 is illustrated as a pin having a larger diameter head, such as one shaped for example like a tack, but a larger diameter head is only one illustrative configuration for pin 10, which could be only a needle-like configuration, hooked, or otherwise. Similarly, lanyard 12 is illustrated as having a key or pin on an end of the lanyard 10, thereby forming a "long pin" 13 as it is sometimes referenced herein. Lanyard 12 may, but need not, provide a path of electrical conductivity, and if conductivity is provided, it may be on a single path (such as a wire) or a multiple path, such as one wire providing an outbound path with a second wire, insulated from the outbound path, providing a return path.

Figure 2:
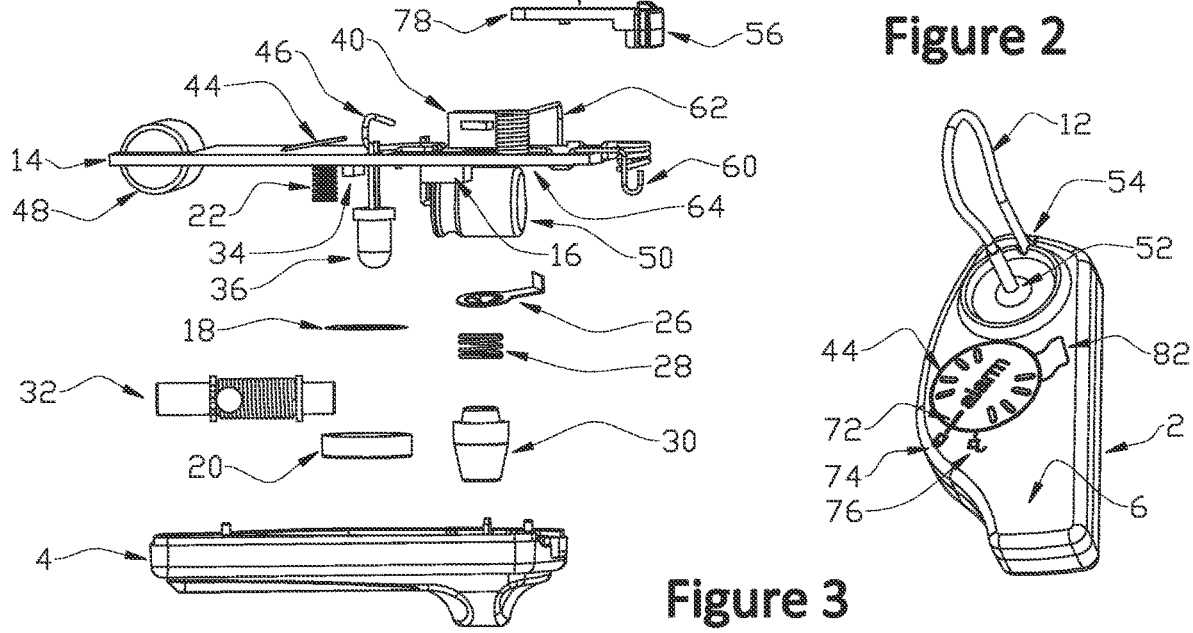
FIG. 2 is an indication of a perspective view of a bottom view of the security tag in a working state, co-using a lanyard accessory.
Figure 3:
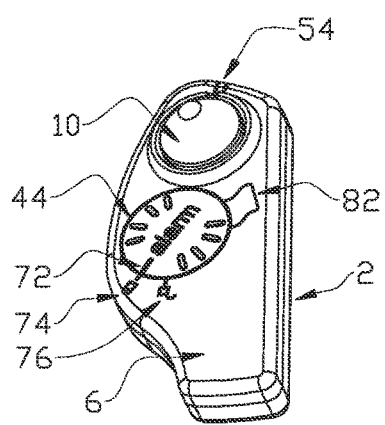
FIG. 3 is an indication of a perspective view of a bottom view of the security tag in a working state, a pin accessory.

FIG. 2 more particularly illustrates the housing 2 co-using the lanyard 12, and FIG. 3 illustrates the housing 2 co-using the pin 10. Note that the accessories may each have an end that is inserted into, or plugs or twists into, one receptor; but another of accessories differs at least in having another end that only is inserted into, or plugs or twists into, a different receptor. Top 4 and bottom 6 can enclose in the housing 2 at least some circuitry that includes a PCB 14, such as one having an integrated circuit (IC) chip 16.

Depending on the embodiment, the circuitry can be configured to detect a locked state, and/or, in some embodiments, be configured to execute a signal transfer function responsive to interchanging the accessories 8.

There can be one or more alarms in communication with the circuitry, as part of the circuitry, or both, triggered by an undisarmed breach of the locked state. That is, PCB 14 can communicate to an external alarm (not shown) and/or to an internal alarm. Illustratively, either or both alarms may be composed of a piezoelectric plate 18 and a speaker structure 20 that transmits sound, reverberating like the cone of a speaker or a drum, against spring 22. The sound may be externalized through one or more portals 24 in the housing 2. Piezoelectric plate 18 cooperates, via the circuitry, with an alarm indication switch 26 that, in communication with spring 28 and lock 30, cooperates such that removal of an accessory 8 from the lock 30 and spring 28 motivates the alarm switch 26 to trigger the alarm.

The PCB 14 can, if so desired, include one or more ferrites 32. For example, the ferrites 32 can be AM/RF ferrites, though one, the other, FM, or the like could be used. Ferrites 32 in some cases can produce a magnetic field detected by a doorway pedestal detector (not shown) sounding a store alarm (not shown). In such embodiments, if the ferrites 32 or alarm/device 1 are not deactivated at a store checkout counter, the ferrites 32 can react by triggering the alarm(s).

Illustratively and in general, 58 KHZ/8.2 MHZ frequency ferrites can be implemented as follows. A 58 KHZ/8.2 MHZ detecting antenna (not shown) communicates with the circuitry of at least one alarm such that as the security apparatus's (58 KHZ/8.2 MHZ) frequency transmitter approaches a detecting antenna, e.g., one installed at a doorway of a store, the frequency transmitter of the security apparatus triggers a store doorway alarm. In some embodiments, if the security apparatus is activated ("ON"), the security apparatus itself will alarm, and in some embodiments, both the store and security alarms will alarm.

If so desired, the housing can contain an RFID tag, such as signal receiver 34, which may be infrared, RF, a GPS delivery device (and/or if desired, a GPS transmitter), or other small-sized wireless transmitting and/or receiving device, like WIFI and so on. Embodiments can combine ferrite and RF capabilities.

The PCB 14 can, if so desired, use or include a visual alarm indicator, such as LED 36, that can be implemented in different embodiments, internal to the security device 1, external such as at a store's doorway, or both. If implemented internally, the LED 36 can be flash at one rate when the lock state is activated and detected, flash at a different rate when changing a security, e.g., IR, code for microswitch 40 (which disarms the security device 1), flashing at yet a different rate and/or more brightly if the alarm is triggered, etc. Illumination from LED 36 can emanate from within housing 2 via hole 40.

For those embodiments in which a battery is used, the battery can in some, but not all, cases be a replaceable battery, illustrated as replaceable battery 42. Battery embodiments can be secured in a compartment formed by the top 4 and bottom 6. PCB 14 can be outfitted with a spring 44 to connect to the anode of battery 42 and another spring 48 to connect to the cathode of battery 42. The battery 42 powers the circuitry, such as via a 3-terminal transformer 48. In some, but not all, embodiments, capacitor 50 can be used to provide the PCB 14 with power for the alarm functions even after being opened by a lockpick (such as a magnet) and after the battery 42 is disconnected, when the circuitry is in the lock state. That is, the capacitor 50 has the electric energy stored to help the alarm device 1 keep its normal, working condition, if only briefly, after power is disrupted.

As noted above, embodiments can differently accommodate the different accessories 8, which can be carried out in several ways, e.g., mechanical, electrical, or both. Thus, certain features may or may not be included in one embodiment or another. For example, as indicated in FIG. 2 and FIG. 3, the embodiment accommodates the pin 10 and the long pin 13 in one portal, mandrel hole 52, but the tail of the lanyard 12 is uniquely, differently, and separately accommodated in a slot 54. The pin 10 and the lanyard 12 or long pin 13 may or may not be incorporated in electrical paths of the circuitry, as may be desired.

Some embodiments can accommodate the lanyard 13 by use of a lanyard pin drawer 56 which has a drawer mandrill hole 57 and drawer hole 58. To illustrate one of many possible configurations, there can be a first conductive signal transfer spring 60 and a second conductive signal transfer spring 62. One end of the signal transfer spring 60 can swingably fit to a PCB mandrel hole 64 in the PCB 14 located to correspond to mandrill hole 52 of bottom 6. Thusly, the first signal transfer spring 60 can springably electrically connect to an inserted one of the pin 10 or the long pin 13 plugged through the mandrel hole 52. Power communicated to the pin 10 or the long pin 13 is communicated to a lock 30 and back to the PCB 14 via spring 28.

The second signal transfer spring 62 operates in conjunction with the lanyard pin drawer 56. When the lanyard pin drawer 56 is extended from the housing 2, the lanyard 12 can be threaded through drawer hole 58 allowing an electrical connection to a conductive portion of lanyard 12, such as via a conductive end 66 of lanyard 12. Conductive end 66 may be bulbus or of a larger diameter than the lanyard 12 tether portion that connects to its long pin 13. In some cases, the lanyard pin drawer 56 can be retracted back into the housing 2, with the end 66 trapped within housing 2 but with the majority of lanyard 12 extending outwards of the housing 2 via a slot 54 in the housing 2. Power is transferred through the second signal transfer spring 62, conductive end 66, and the lanyard 12 back into the circuitry of PCB 14. As the second signal transfer spring 62 disengages from one portion of the circuitry to engage the conductive portion or end 66 of the lanyard 12, the circuitry changes to differently accommodate lanyard 12 vis a vis pin 10. With drawer 56 retracted into housing 2, the drawer hole 58 in drawer 56 aligns with hole 52. Thus, the long pin 12 can be inserted into mandrill hole 52 and drawer mandrill hole 57 through to lock 30, and the drawer 44 is secured into housing 2 to constrain end 66 of lanyard 12 within housing 2. In this example, the different accommodating of the different accessories 8 is carried out by both mechanical and electrical means, but it can be one or the other as may be desired.

In some embodiments, battery cover 68 can be connected to (e.g., screws into or clips into, so in some cases to be rotatable) housing 2 via battery compartment opening 70. The battery cover 68 has a marking 72 that rotatably can point to a lock marking 74, or to an unlock marking 76, on housing 2. When battery cover marking 72 points to the lock position 74, an arm or notch 78 in battery cover 68 mates with a protuberance 80 of drawer 56 when the drawer 56 is withdrawn into housing 2, thereby securing the battery cover 68 from opening. Thusly, when lanyard 12 or pin 10 is inserted through the holes 52, 57, and 64, the drawer 56 cannot be withdrawn, and the battery cover 68 cannot be opened.

Battery cover 68 and battery compartment opening 70 and the location of battery 42 within housing 2 are collectively configured so that nonconductive tape 82 on a new battery 42 extends through the opening 68, and such that by pulling on the tape 82 sufficient to separate the tape 82 from a conductive path to battery 42, the alarm is conveniently armed.

Figure 4:
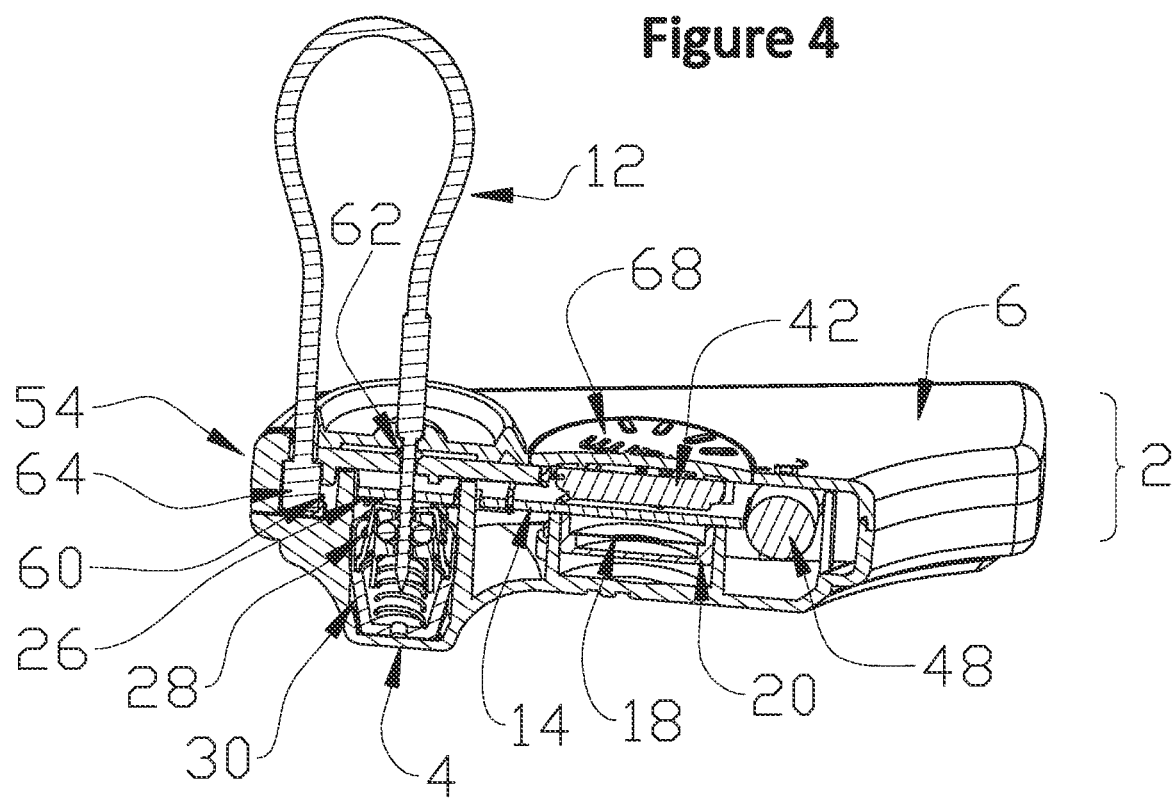
FIG. 4 is an indication of a cutaway side view of the security tag in a working state, co-using the lanyard.
Figure 5:
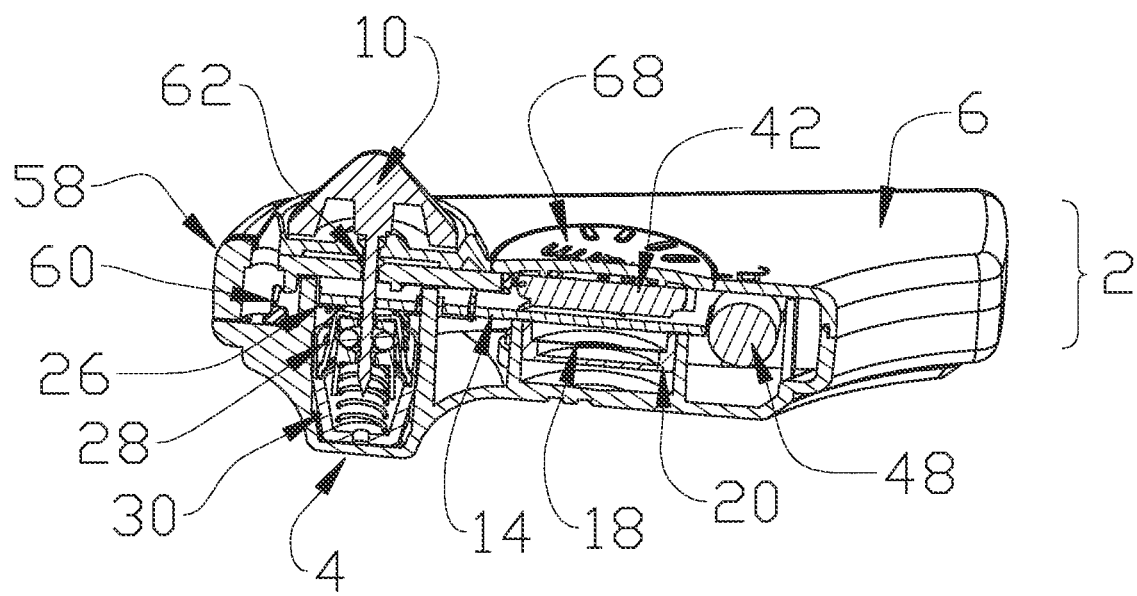
FIG. 5 is an indication of a cutaway side view of the security tag in a working state, co-using the pin.
Figure 6:
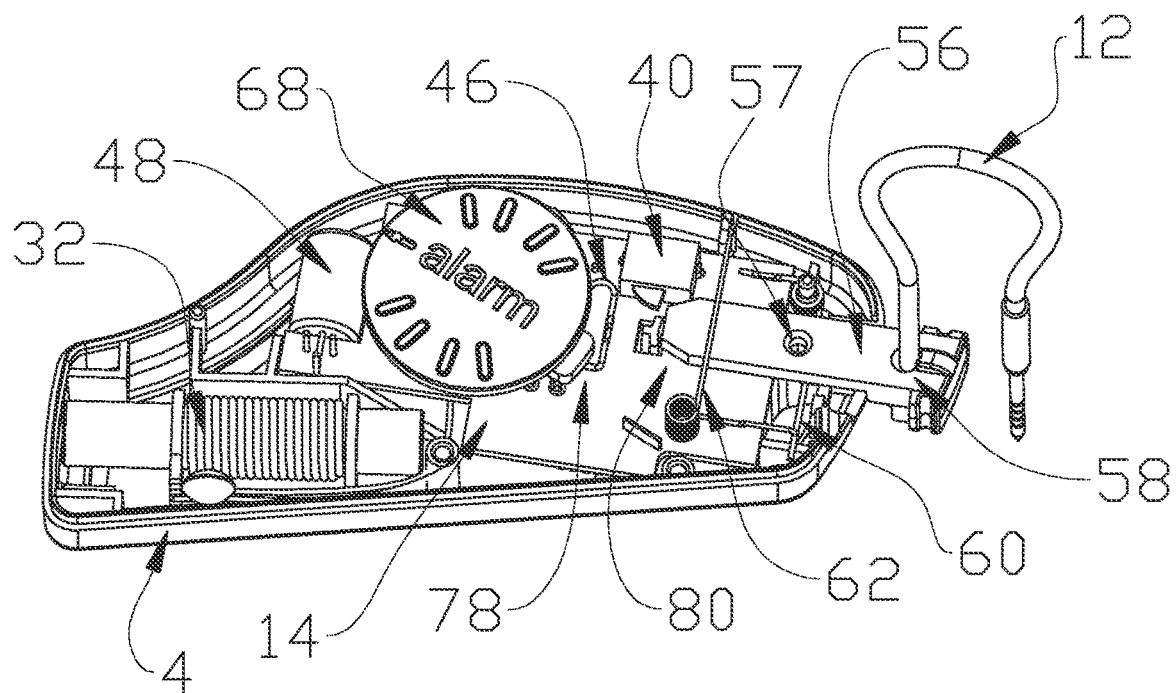
FIG. 6 is an indication of a cutaway top view of the security tag, co-using the lanyard, with a drawer extended.
Figure 7:
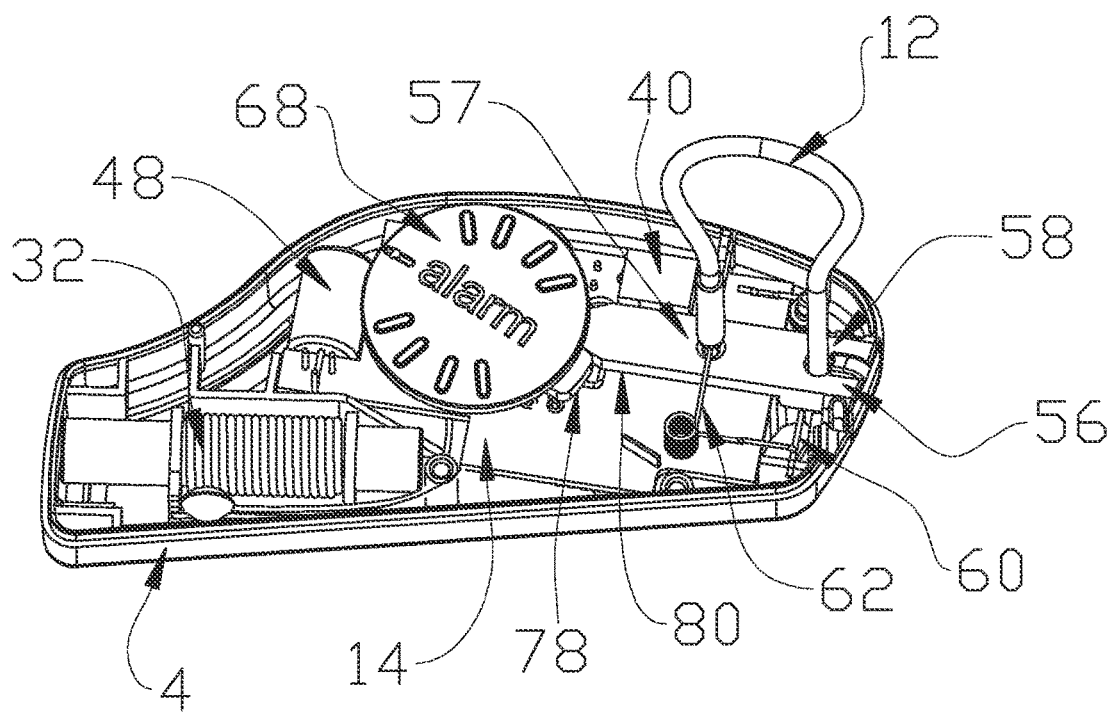
FIG. 7 is an indication of a cutaway top view of the security tag, co-using the lanyard, with the drawer withdrawn.
Figure 8:
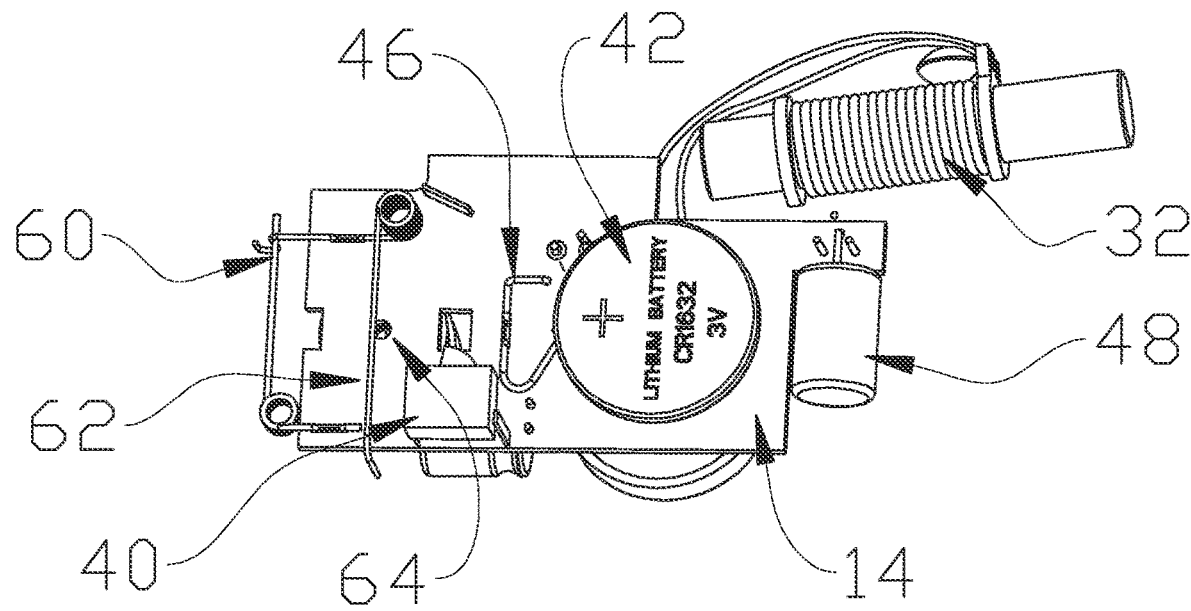
FIG. 8 is an indication of a top view of some components of the security tag.
Figure 9:
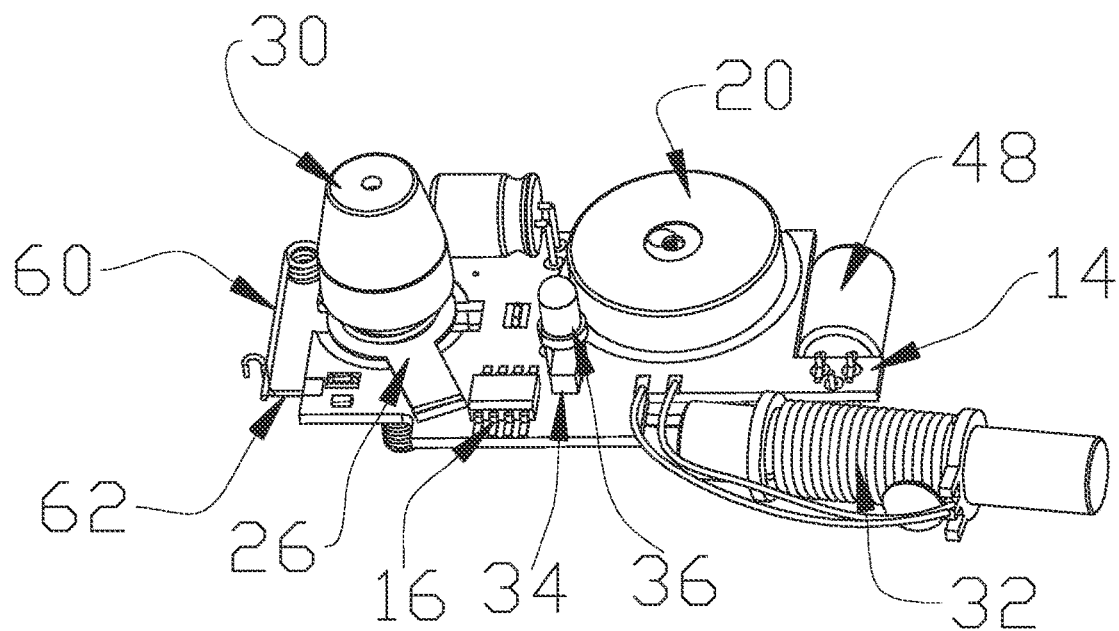
FIG. 9 is an indication of a bottom view of some components of the security tag.
Figure 10:
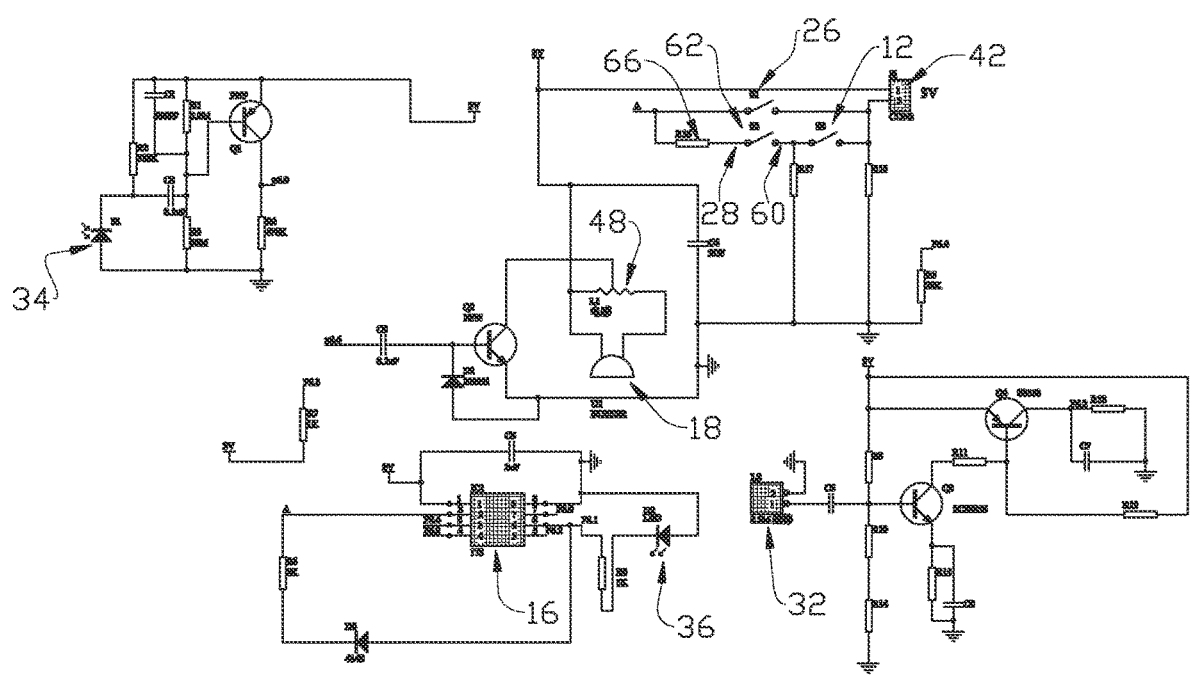
FIG. 10 is an indication of a circuit diagram of the security tag.

FIG. 4 is an indication of a cutaway side view of an embodiment in a working state co-using the lanyard 12 that uses a long pin 13. FIG. 5 is an indication of a cutaway side view of an embodiment in a working state co-using the pin 10. FIG. 6 is an indication of a cutaway top view of an embodiment co-using a lanyard 12 that uses a long pin 13, with a drawer 56 extended. FIG. 7 is an indication of a cutaway top view of an embodiment co-using a lanyard 12 with a long pin 13, with the drawer 56 withdrawn. FIG. 8 is an indication of a top view of some components of an embodiment. FIG. 9 is an indication of a bottom view of some components of an embodiment. FIG. 10, which is an indication of a circuit diagram identifying some of the components. Some embodiments coat at least some of the circuitry, especially the PCB and IC, with a silicone paint to protect against liquid that might otherwise disable the device's circuitry.

Figure 11:
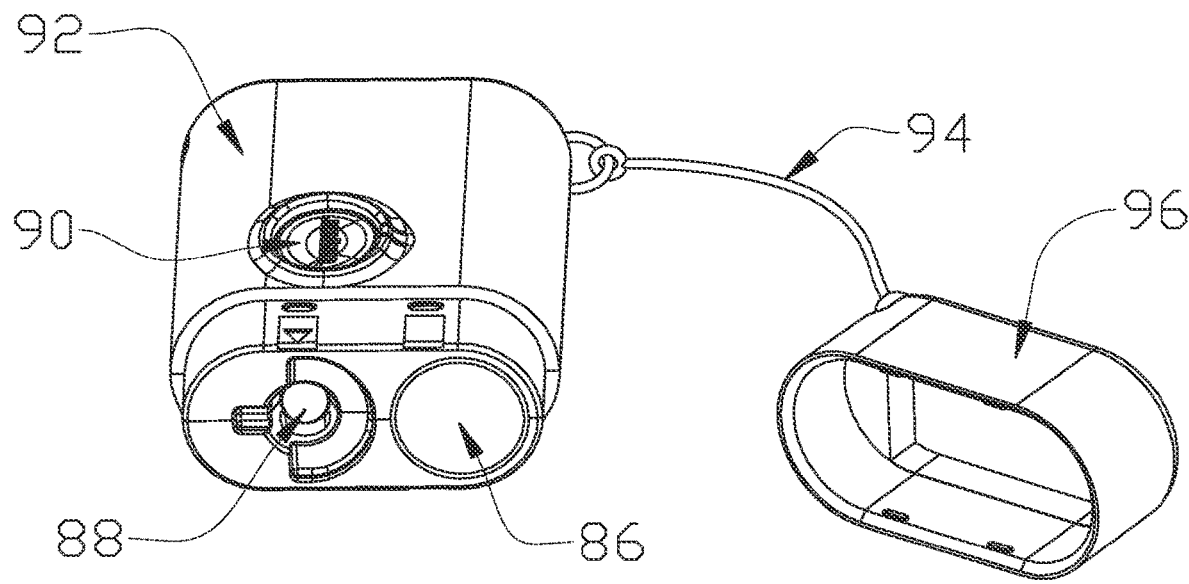
FIG. 11 is an indication of a disarming device for an embodiment such as the security tag.

Turning now to FIG. 11, there is an indication of a disarming device 85 illustrative of a device structured to disarm the alarm (e.g., 18, 20, and 21), or circuitry or device 1 from its working state. In this teaching embodiment, the disarming device 85 combines a magnet 86 to unlock the magnetic lock 30 and an IR transmitter 88 for communicating an IR/RF or other signal to receiver 34. Decoder switch 90 is used to send a communication from the IR transmitter 88. These can be allocated according to a decoder control shell 92 which may, if so desired, have a string 94 or tether, and a cover 96 for ends of the IR transmitter 88 and magnet 86, which can if so desired, block the magnetic field from magnet 86 and communication from IR transmitter 88. The combined magnetic and broadcast locking adds security as the combination is not disabled by one or the other.

In operation, the disarming device 85 is uncapped (if a cap embodiment is used), located adjacent to the lock 30, and rotated in a circular motion to unlock magnetic lock 30; additionally, decoder switch 90 is depressed to transmit an IR code signal to receiver 34 to disarm the lock state.

Figure 12:
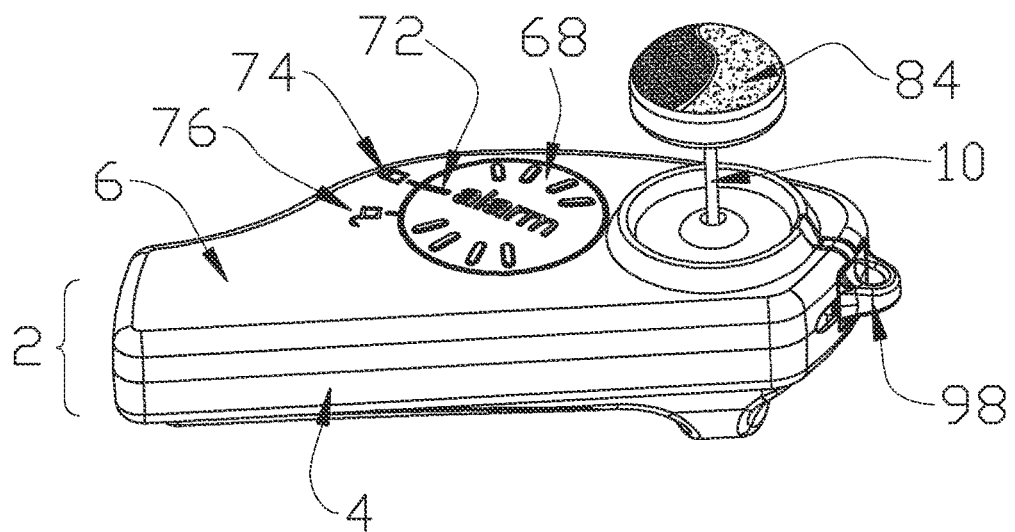
FIG. 12 is an indication of the security tag having another accessory.

As previously mentioned, the accessories 8 are not limited to a pin 10 or lanyard 12, or use of these in any particular implementation. These are teaching examples. To emphasize this aspect of the disclosure, FIG. 12 provides an indication of an alternative embodiment having a double-colored flathead pin as pin 10. If so desired, a screw or rotary motion can be required to insert a pin 10 or other accessory; and in another embodiment, the screw or rotary motion can be restrained with the pin 10 being a key in a lock. Other accessories may be configured with a head wider than its shank, such as a + shape, Z shape, and so forth. A pin may also have a harpoon, barbed, or other shape requiring disconnection from the security device to push the pin through whatever has been secured. Instead of a lanyard, a U shape can be used depending on the implementation of interest.

Figure 13:
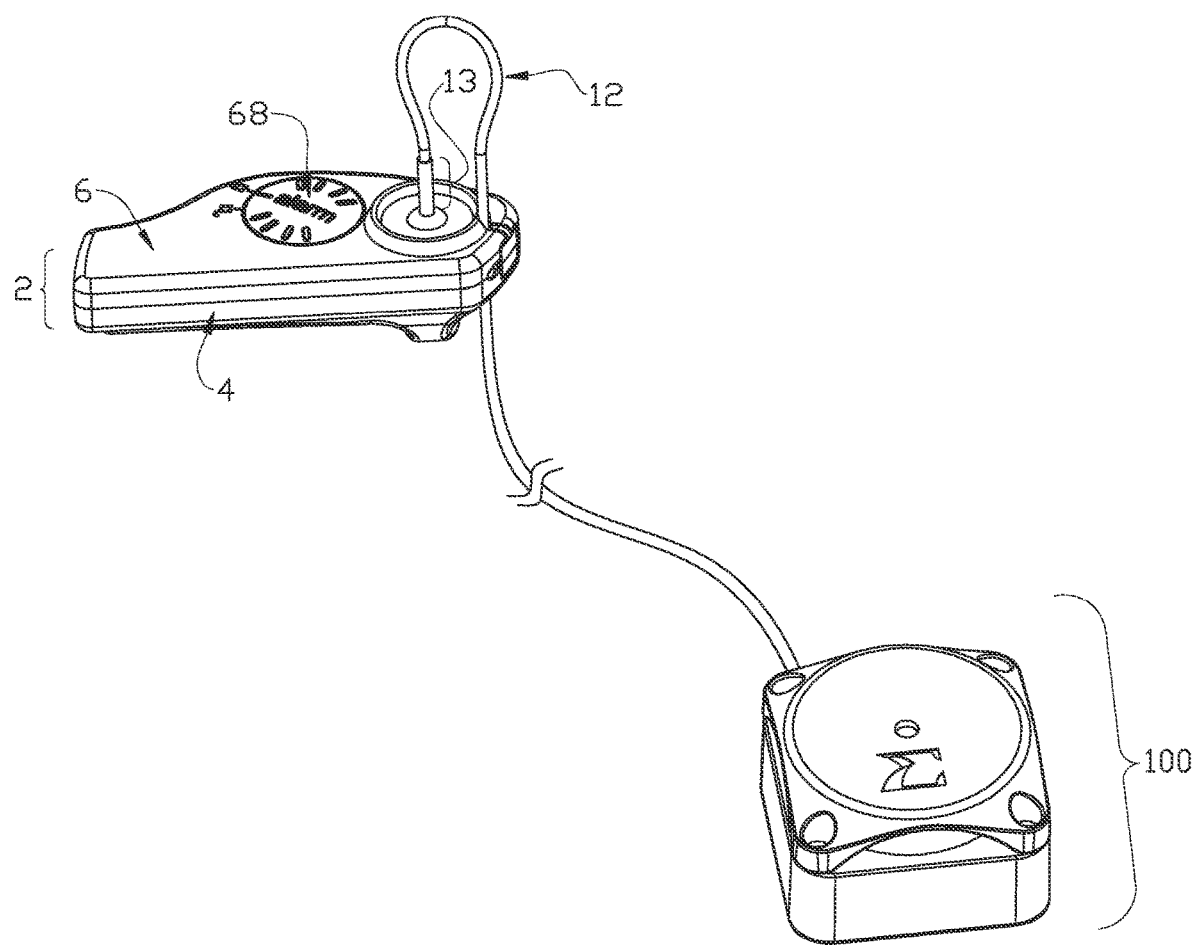
FIG. 13 is an indication of the security tag with yet another accessory, prescribing a loop and having multiple alarms.

Another example of an accessory 8 is shown in FIG. 13 which makes use of some of the invention disclosed in U.S. Pat. Nos. 9,711,032 and 9,489,808 and incorporated by reference, as discussed below, as modified for cooperation with the convertible device. The teaching illustrates several possibilities for the accessory and for powering the aforesaid convertible device: (a) powered separate from another powered device; (b) powered interactively with another powered device; or (c) powered at least in part by another device (i.e., not necessarily reliant on a battery).

Generally, in FIG. 13, the other device is another alarm apparatus accessory 100 with an extension, tether, or lanyard 12 which may, but need not always, include a protrusion or connector such as a long pin 13. Note that in this example, lanyard 12 is threaded through the housing 2 and/or drawer 56. The lanyard 12 can have wiring, and the other alarm device (or both alarm devices depending on the implementation desired) can detect for a change in electricity running through the wiring of the lanyard 12. For example, the alarm apparatus accessory 100 can detect for a change that would occur when the electricity is interrupted, such as when the wiring is cut, much like the teaching indicated for the convertible device, as in FIGS. 1-3.

The lanyard 12 can be releasably connectable to the housing 2 of the convertible device 1 so as to form a loop in which an item can be secured for protection, e.g., from theft. For example, if the item to be protected is a purse connected with a handle (strap, ring, or other device with a hole as part of it), the purse handle can be lassoed by a loop formed essentially by the housing 2 and the lanyard 12, in some cases also including the long pin 13 or other connector. As discussed below, alarm apparatus accessory 100 can also be outfitted for attachment to another object, e.g., outfitted with an adhesive pad to attach alarm apparatus accessory 100 to a store shelf, rack, or counter.

Generally, the alarm apparatus accessory 100 can include a first switch having ON and OFF positions, and a second switch having ON and OFF positions. The first switch can be used to turn the alarm ON or activate the alarm, and in some cases, turn the alarm OFF or deactivate the alarm. The second switch can, for example, be a spring-loaded switch located on the alarm apparatus accessory 100 so that the switch is triggered OFF when the alarm apparatus accessory 100 is separated from a surface to which the alarm device is adhered or mounted, e.g., the switch thereby interrupting the electricity. In some, but not all cases, there can be a third switch, e.g., receptive to a remote control, to turn OFF an alarm of the alarm device or turn the alarm apparatus accessory 100 to a standby mode, as the device 1 can have, if so desired. The alarm can be one or more of a buzzer, light, bell, broadcast, etc. An electrical interrupt can be a switch, a plug, etc., which when disconnected interrupts the flow of electricity, etc.

Circuitry of the alarm apparatus accessory 100 unites cooperation of its switches employed in the embodiment of interest (illustratively here, the first, second, and the third switches) and its alarm. The alarm apparatus accessory 100 (which may, but need not always, be battery powered) can be activated when the first switch is ON and the second switch is located in a retracted, ON position; the alarm is triggered when the circuitry detects an electrical change in the path of the lanyard 12 or when the second switch is relocated in an extended, OFF position; and the alarm is deactivated by the third switch, which if so desired, can be responsive to receipt of a broadcast code from a remote control, as per FIG. 11 or otherwise, and/or by location of the first switch to OFF.

In some implementations, the alarm apparatus accessory 100 can be structured so that the lanyard 12 is a key implementation of long pin 13 which locks or unlocks a switch, such as the first switch of device 100 to the ON position. The key or long pin 13 is releasably connectable to the housing 2 by the lock 30, such as a magnetic lock having a magnetic key as illustrated in FIG. 11. Various embodiments of the alarm apparatus accessory 100 can be implemented as may be preferred in one application or another.

Turn now more particularly to FIG. 13 which provides an overview, in perspective, illustrative some but not all embodiments of an alarm apparatus accessory 100. In this overview figure, the alarm apparatus accessory 100 is associated with lanyard 12, which in this case, includes a long pin 13 adjacent to a flexible, electrical path in lanyard 12. The lanyard 12 can, for example, be comprised of a dual core wire 3 (such as Iron and Copper) defining the electrical path. As illustrated in FIG. 1, the long pin 13 can be inserted into housing 2 to form a looping portion of path in connection with the housing 2. Also there can in some cases be a remote control disabling device, such as the broadcast portion of disarming device 85 in FIG. 11, which is operable to turn the alarm apparatus accessory 100 OFF or into a standby mode (as per device 1), depending on the implementation of interest. In some embodiments, disarming device 85 is operable in whole or part to turn the alarm apparatus accessory 100 ON and/or into an activated mode. The disarming device in FIG. 11 can be used here too. Such IR remote controls are used in television and cable box switching, and suppliers include Sharp™ LG™ Samsung™ and Comcast™, and ATT™ digital.

Figure 14:
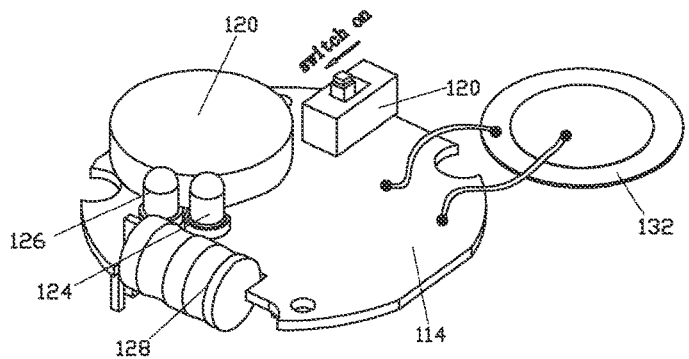
FIG. 14 is an indication of components of the other accessory.
Figure 15:
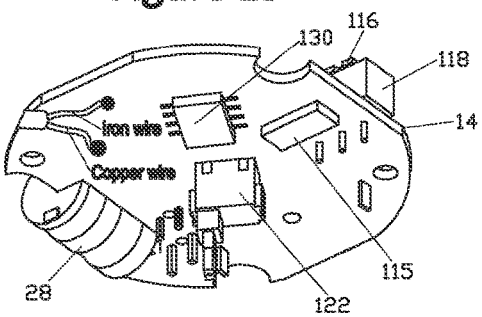
FIG. 15 is an indication of a partial, cutaway view of the top of the other accessory.

FIG. 14 and FIG. 15 collectively illustrate embodiments implemented with circuitry that can, but need not, comprise a printed circuit board having elements on both sides. Upon the printed circuit board circuitry 114 can be a first switch 116, having ON and OFF positions. If so desired, the first switch 116 can be disposed so that movement of a switch 116 position to a position more central to the circuit board 114 will turn the power ON for the alarm apparatus accessory 100. In some cases, there can be a portal 118 located and structured to receive and guide the long pin 13 to dispose the first switch 116 from OFF to ON. Power can be provided by a battery 120 or otherwise. For example, the battery 120 can be a 1623 battery with a weld leg, which can be used with diode 115 to sturdy the voltage of battery 120. Further, there can be a second switch 122, for example a micro switch, operable by a spring-loaded plunger to have an extended OFF position and a retracted ON position. The extended position can reach farther outwards from an exterior surface of the alarm apparatus accessory 100 than in the retracted position.

If so desired, the printed circuit board circuitry 114 can cooperate with an indicator light 124 (e.g., an LED) which illuminates, e.g., periodically, when the power is ON. Also, if so desired, there can be a third switch 126, such as receiver operable to receive a broadcast signal from the remote control, e.g., disarming device 85, to turn the alarm apparatus accessory 100 OFF or to a standby mode. The remote control can, if so desired, broadcast an infrared code to which the receiver/switch 126 is receptive for controlling its switching. Such remote controls and receivers are commonly commercially available.

The alarm apparatus accessory 100 can have an inductance device 128. Such devices are commonly available and sometimes known as an "audio push switch adapter." An audio push switch adapter has two different-diameter copper coils and a magnetic bar/ferrite rod. These cooperate so that when a control chip 130 (discussed below) sends out a small, pulsing signal, the inductance device 128 transfers the small signal from the control chip 130 into a large signal which drives an alarm 132, e.g., a buzzer wafer, also known as a piezoelectric wafer (e.g., 20 mm) much like piezoelectric plate 18, which then produces an alarm sound. Other alarms can be used, e.g., a bell, light, broadcast, indicator, etc.

The printed circuit board circuitry 114 can include the control chip 130, which can be a small IC control chip. Chip logic can be hard wired or implemented with a CPU (e.g., for a computer) and programmable logic or a combination thereof. The chip 130 can be a HS173NS08-J (available from Shenzhen Bofutong Technology Co., ltd.) or the like.

Figure 16:
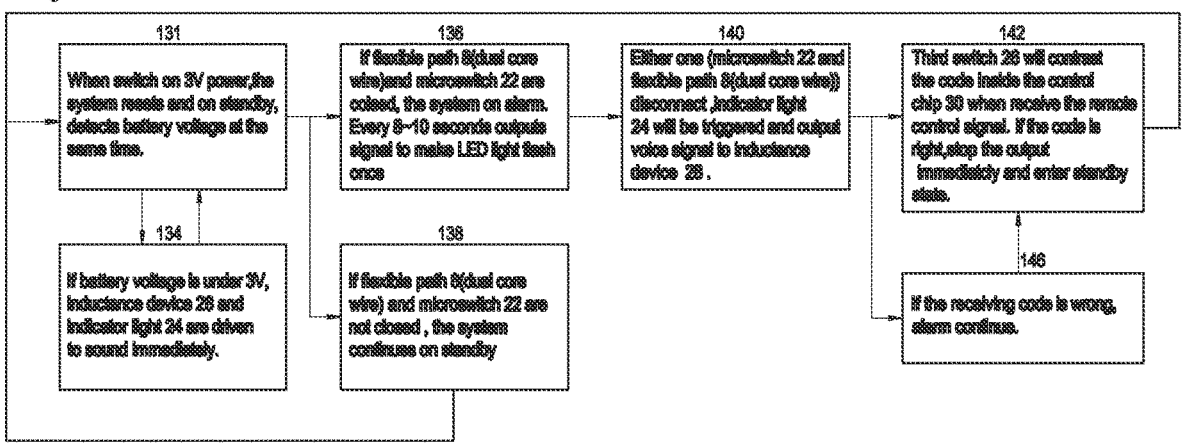
FIG. 16 is an indication of a partial, cutaway view of the bottom of the other accessory.

Program logic can, but need not, be such as in FIG. 16, such that when power (e.g., 3 volts) is turned ON for the control chip 130, in block 131, the logic resets and, in a standby mode, detects to test battery voltage. In block 134, if the voltage is under a threshold, e.g., 3 volts, then inductance device 128 and alarm 132 are triggered into an alarm mode, e.g., driven to sound the buzzing alarm. Blocks 136 and 138 also test for voltage. In block 136, if the second switch 122 is ON and the power is ON in the path, then alarm device 100 is in an activated mode. Control chip 130 outputs a signal to make the indicator light 124 illuminate, and if desired, illuminate again every 8-10 seconds while in the activated mode. However, in block 138, if the second switch 122 is not ON and/or there is not power in the electrical path, then the logic remains in standby mode, returning to block 132. When the alarm device 100 is activated in block 136, block 140 tests for a change in state, such as the second switch 122 being changed to OFF and/or there being no power in the electrical path. If there is a change in state, then inductance device 128 and alarm 132 are driven to trigger the alarm 132, e.g., buzzing, and if so desired, trigger another alarm indication such as having the indicator light 124 illuminate constantly, (or pulsate multiple times per second, depending on the preferred implementation) etc. Block 142 tests for a broadcast, such as a code, from remote control 112. If the code is recognized by the third switch 126, then the alarm 132 is no longer triggered, e.g., the buzzing of alarm 132 and constant illumination of the illumination indicator 124 will cease. Thusly, the logic from the alarm mode leads to the standby mode and block 132. In block 146, if the code is not received and recognized, then the alarm 132 remains triggered, and such as the buzzing and illumination will continue.

Using the alarm apparatus can commence by turning the first switch 116 ON and pressing the second switch 122 to activate the alarm device 100 into the logic in FIG. 16. In a stabilized, activated mode, if so desired, the indicator light 124 can flash one time, and then periodically, e.g., each 8.8 seconds. The process can include detecting, by the control chip 130, both ends (e.g., the Iron and Copper wires) of the dual core wiring of electrical path of lanyard 12 in real time, and detecting whether the second switch 122 is ON: if the control chip 130 detects that resistance in the electrical path is weaker or stronger than expected, or if the second switch 122 is OFF (interrupting the power), then the process includes sending, by control chip 130, a signal to the inductance device 128 which makes the alarm 132 buzz or otherwise indicate that the alarm has been triggered. Stopping the alarm 132 from buzzing, by changing alarm device 100 OFF or to a standby mode, can be carried out by sending a broadcast signal from the remote control 112 and receiving the broadcast signal by the third switch 126, which is detected by the control chip 130 to cease the alarm 132's buzzing. Alternatively, or combinatively, switch 116 can be disposed to the OFF position.

In sum, the circuitry 114 of alarm device 100 can be configured to detect a change in state, such as an electrical interrupt, which may be produced in different ways, including when the battery 120 is weak, as per the convertible device. The electrical interrupt can also be produced by any of a short circuit, weak indication of resistance, a strong indication of resistance, the wiring being cut, and power otherwise being terminated in the electrical path, be it for alarm device 110 or for the lock state of the convertible device, whereupon any form of alarm can be turned ON.

Figure 17:
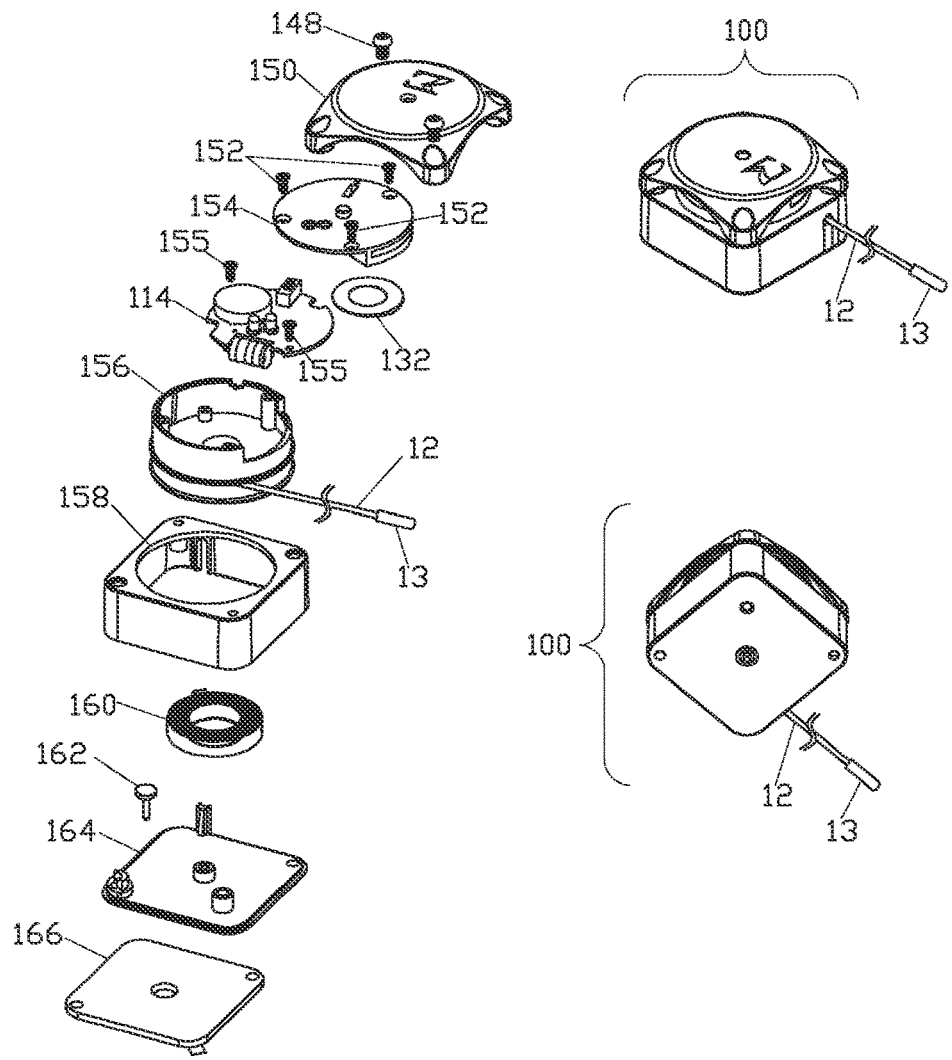
FIG. 17 is an indication of a logic flow diagram of the other accessory.

FIG. 17 illustrates a manner of making an alarm apparatus accessory 100, which can be a standardized alarm device 100, just like the convertible device 1 can be standardized, for operable combination with different extensions or lanyards 12 and/or long pins 10. Continuing on with the illustration, there can be (e.g., two) anti-theft sunk screws 148 insertable through cover 150, which can be plastic, to encase (e.g., three) cross sunk, self-tapping screws 152. Self-tapping screws 152 are insertable into an acoustic platform 154 to which alarm 132 is attached. There can be (e.g., two) screws 155 to mount printed circuit board circuitry 114 to a pulley 156. Platform 154 is mounted by its screws 152 to the pulley 156 so as to encase circuitry 114. Pulley 156 is attached to lanyard 12, leading on to the long pin 13 shown as inserted into housing 2. A shell 158, located above the platform 154, is attached to the cover 150 by the screws 148. Openings can be provided through alarm device 100 to more fixedly attach the alarm device 100 than by just relying on adhesive means. Spring 160 is located to dispose the pulley 156 to a retracted position and is mounted to thimble 162, which can be made of Copper and serve as an axle for pulley 156. Thimble 162 rests in bottom cap 164 to which an adhesive sticker 166 is adhered. Adhesive sticker 166 can have a tabbed cover that is removed to expose an adhesive face which can be employed to bottom cap 164 to adhere alarm device 100 to a surface.

One end of the electrical path in the lanyard 12 extends via the pulley 156 to be soldered or welded such that each of the wires 173 and 175 of the electrical path are electrically connected to the printed circuit board 114. Board 114 is fixed on the pulley 156, which is encased by shell 158, and one end of the spring 160 is fixed to the thimble 162 axle and another end is fixed to the 156 pulley to dispose the pulley 156 to a spring-retracted position.

If so desired, there can be another adhesive sticker located to cover portal 118 until pierced by long pin 13 to indicate that the first use of the device 100 has not been made subject to tampering. There can be printing on this other sticker indicative of the location to be pierced by long pin 13 to dispose first switch 116 to an ON position. For example, this other sticker can have dot indicative of the location for the piercing, and if desired, any or all of the following: one or more arrows pointing to the dot; printing the dot in color other than the color of the pulley 56, such as red for a white pulley 156; and wording such as "PIN IN." Note that for security, Long pin 13 can be configured as a key having a blade or the like that requires rotation in a keyway to enable/disable the first switch 116.

Some embodiments can require removal of cover 150 to dispose the first switch 116 to the OFF position, and another approach is to configure cover 115 to have an opening structured to allow long pin 13 to dispose the switch to the OFF position. For tamper protection, this removal can be implemented with a special screw driver, i.e., not a slotted or cross type, but for example, an external, cruciform, Roberson, hexalobular, tap, double square, or tamper-resistant type to match with screws 148 and/or 152.

To use such an embodiment, when alarm device 100 and the convertible device are activated, the process can include detecting, by the alarm device 100, the resistance on the path 118: if the resistance increases, or if the path 118 is shorted or cut (interrupted), or power surges, then the process includes triggering the alarm device 100 to have the alarm 132 sound.

Figure 18:
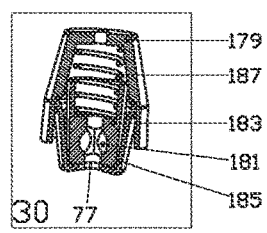
FIG. 18 is an indication of a cutaway view of a lock.

FIG. 18 illustrates lock 30. Lock 30 is known as a clutch lock which works like a clutch in a car when it is pushed or released by some force, in this case a magnet 86 can be used to release of the long pin 13. Companies providing locks such as lock 30 include TYCO™ (Sensormatic Hard tags), Check Point™ (Alpha Products), Invue CO™, and Oumeisheng Electronic Co., Ltd.™. When the pin 10 or long pin 13 is inserted into lock 30, the pin 10 or long pin 13 will lodge between steel balls 181 to lock firmly there between. When a magnetic key 86 is applied to the side 179 of the lock 30 having a securing bowl 183, the magnetic influence of key 86 will draw the spring 187 toward the magnet 86, allowing repositioning of the steel balls 181 so that pin 10 or the long pin 13 is released.

Figure 19:
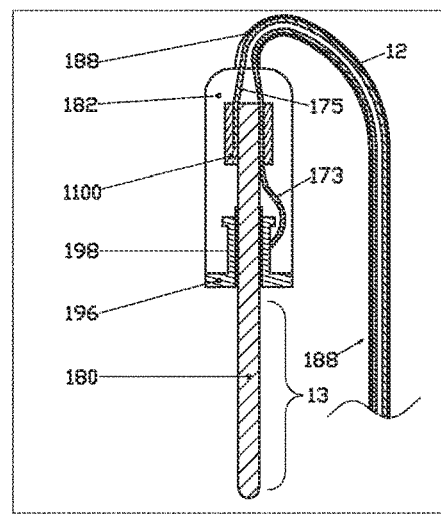
FIG. 19 is an indication of a cutaway view of a long pin for the other accessory.

Turning now to FIG. 19, illustratively teaching a version of long pin 13, and in this embodiment, long pin 13 can extend from a conductive ring 196, pass within an insulation layer 198, and extend to Copper securing layer 1100, within cover column 182. Path 118, e.g. a dual core which includes Copper branch 173 and an Iron branch 175. In some embodiments, (not shown in the Figure), the electrical path 188 can communicate power to a convertible device or interact electrically with the convertible device, e.g., by electrical connections to exposed portions of Iron branch 175 and Copper branch 173. In other embodiments, the Iron branch 175 is in electrical communication with the Copper branch 173, and the convertible device and alarm device 100 are mechanically connected but electrically independent (shown in FIG. 19). Still, when the alarm apparatus accessory 100 is activated, removal of the pin 10 or long pin 13 from the lock 30 will trigger the alarm of the convertible device 1, and if electrical path 188 is interrupted, the alarm 132 will be triggered, e.g., to buzz.

In embodiments utilizing a magnetic lock 30, a magnetic key magnet 86 can be used to unlock the long pin 13 from the housing 2 and lock 30.

In operation, there can be a process of detecting, by the alarm apparatus accessory 100, for a charge in state, such as a change in resistance, a short circuit, a surge, lock state, etc. The process can also include sending, by the alarm apparatus accessory 100, a signal on the path 1888 to the light 190 to flash an indication that the alarm apparatus accessory 100 is activated. When a magnet 86 opens the lock 30, the process includes disconnecting or disarming the alarm apparatus accessory 100. At the time when the long pin 13 disconnects from cylinder lock 30 in an armed state, the process can include interrupting the power in path 188, causing the alarm apparatus accessory 100 to sound the alarm 132 and triggering the alarm of the convertible device 1.

As emphasized herein, various accessories 8 can be used. For example, embodiments can employ a plurality of lanyards 12, each of a different length, or a connector can be inserted intermediate two lanyards 12, to have the appropriate length to wrap around a product, e.g., in the manner of a spider wrap embodiment. Alternatively, a ratchet, recoiling tether, or other tightening mechanism for one or more lanyards 12 can be employed. Accessories typically are replaceable.

Also, for example, in cases where the convertible device 1 can has electrical power communication with an accessory 8, the accessory 8 might comprise an electrical USB, or a MINIUSB plug and detect for the interruption in electricity that would occur when the plug is disconnected from a computer or other such electrical device or source; yet another accessory might employ an additional switch adjacent an end of the lanyard 12 distal to the long pin 13 that interrupts electricity when the item to be protected is separated from the additional switch, e.g., separating a perfume bottle from the adhesively-attached additional switch; and so forth. Yet these accessories 8 can all utilize essentially the same, standardized alarm device 1. Note that in some cases, such as a USB accessory, an electrical signal in the accessory can be detected by, or provided, via a coil or magnetic field.

Many of the implementations flow from the teachings and principles disclosed herein.

Additionally, there can be a process for manufacturing that includes making a standardized alarm device 1 such as is illustrated FIGS. 1-3 in in quantity, and making quantities of different types of accessories 8, and combining a portion of the standardized alarm devices 1 with two or more of the types of accessories 8 and another portion of the standardized alarm devices 1 as illustrated in FIGS. 1-3 with another of type or types of accessories 8 (differing by at least one type of accessory 8), to form different types of articles of manufacture, related by the commonality of the standardized, convertible alarm device 1. In such a process, the standardized convertible alarm devices 1 have essentially identical hardware, but different types of accessories 8. Or in some cases, there can be an accommodation of the different types of accessories 8, but still use the same detecting of an electrical interruption or change in state or lock state detection provided by the standardized convertible alarm devices 1.

From another perspective, there can be a process for manufacturing and packaging one or more the accessories, individually or in combination. For example, the lanyard 12 is uniquely structured to fit in more than one receptor, such as by way of a drawer as discussed below, and this lanyard 12 can be produced and packaged itself or in combination with another of the accessories such as pin 10. Later, a consumer can combine the accessories with the separately-provided circuitry and housing 2.

In some embodiments, switching can be used to detect whether the housing 2 has been breached, and/or a portion of the circuitry can be covered with an insulating paint to protect against attempted deactivation with a liquid such as a silicone paint.

So then, there may, but need not always—depending on the embodiment of the broader teaching herein—be an apparatus or article of manufacturing that includes a housing and circuitry which detects a locked state, the circuitry configured to execute a signal transfer function responsive to interchanging a pin and a lanyard in the circuitry, and/or the housing including a replaceable battery compartment locked by inserting either the pin or the lanyard into a lock mechanism which differently secures the pin and the lanyard; and an alarm, in communication with the circuitry, triggered by a (an undisarmed) breach of the locked state. In some but not all embodiments, the alarm can be a security tag that includes the replaceable battery compartment, and the alarm can be within the housing, collectively structured so that opening the lock mechanism during the locked state triggers the alarm. In another manner, the alarm is within the housing, and opening the housing during the locked state triggers the alarm.

In some, but not all, embodiments, the lock mechanism can be disarmed by a magnetic field, a wireless signal, and/or a magnetic field cooperating with a wireless signal, for example, the lock mechanism being disarmable by a magnetic field cooperating with a wireless signal.

Where a pin is used as one of the distinct accessories, if the pin is in the circuitry, removing the pin from the lock mechanism during the locked state triggers the alarm, and if the lanyard is used as one of the distinct accessories and in the circuitry, removing an end of the lanyard from the lock mechanism, or cutting the lanyard, during the locked state triggers the alarm.

In some cases, the security tag can include the replaceable battery compartment and a battery in the replaceable battery compartment, the battery in contact with a plastic tab which separates the circuitry from at least one of an anode and a cathode of the battery, the plastic tab extending out of the replaceable battery compartment sufficient that when the replaceable battery compartment is locked, the plastic can be pulled to unseparated the battery from the circuitry and thereby arm the circuitry to commence detecting the locked state.

In many embodiments, the apparatus or article of manufacture can utilize a coating on the circuitry to protect the circuitry against disablement from insertion of a liquid into the security tag.

Some but not all embodiments can involve an alarm in addition to the security tag, such as an in-store alarm system or another security tag. For example, there can be the security tag and at least one other alarm apparatus including the pin; the lanyard as an extension from the pin, the lanyard including a flexible line which provides a path of electrical conductivity, an alarm device, electrically connected to the flexible line at an end of the flexible line distant from the pin, the alarm device including, a first switch, a portal located and structured to guide the pin to dispose the first switch from OFF to ON, a second switch operable by a plunger having an extended position and a retracted position, the extended position reaching farther outwards from an exterior surface of the alarm device than the retracted position; a third switch operable by receipt of broadcast of energy, an alarm device alarm, alarm device circuitry located to electrically communicate with the path, the alarm device circuitry having a structure which unites cooperation of the first switch, the second switch, the third switch, and the alarm device alarm, such that: the alarm device alarm is activated when the first switch is ON and the second switch is in the retracted position, the alarm device alarm is triggered when a detector detects an electrical change in the path or when the plunger of the second switch is located in the extended position, and the alarm device alarm is deactivated by the receipt of the broadcast of energy by the third switch or by location of the first switch to OFF.

In sum, with respect to the description herein, numerous specific details are provided, such as examples of components and/or methods, to provide a thorough teaching and understanding of embodiments of the present invention. One skilled in the relevant art will recognize, however, that an embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Similarly, embodiments can be implemented in many forms, and based on the disclosure and teachings provided herein, a person of ordinary skill in the art will appreciate other ways and/or methods to implement an equivalent. Reference throughout this specification to "one embodiment", "an embodiment", or "a specific embodiment" means that a particular feature, structure, or characteristic described in connection with the embodiment is included in at least one embodiment and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other embodiments. It is to be understood that other variations and modifications of the embodiments described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as otherwise operable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments, including what is described in the Abstract and the Summary, are not intended to be exhaustive or to limit the invention to the precise forms disclosed herein. While specific embodiments of, and examples for, the invention are described herein for teaching-by-illustration purposes only, various equivalent modifications are possible within the spirit and scope of the present invention, as those skilled in the relevant art will recognize and appreciate. As indicated, these modifications may be made in light of the foregoing description of illustrated embodiments and are to be included within the true spirit and scope of the disclosure herein provided.

The invention claimed is:

1. A process of making a product, the process including:
combining housing and circuitry that detects a locked state, the housing and the circuitry structured to combine with one of a plurality of interchangeable accessories, the accessories including a pin and a lanyard, the housing including a replaceable battery compartment that is locked by inserting either the pin or the lanyard into a lock mechanism that differently secures the pin and the lanyard, the circuitry including a wireless receiver that disarms the locked state responsive to a received wireless signal and further includes an alarm triggered by an undisarmed breach of the locked state.

2. The process of claim 1, wherein the combining is carried out with the wireless receiver being an infrared receiver and the received wireless signal being an infrared signal comprising a code, and further including associating a disarming device with the circuitry, the disarming device configured to issue the infrared signal comprising the code.

3. The process of claim 1, wherein the combining is carried out such that when the lanyard is inserted into the lock mechanism, the circuitry includes a spring adjacent a first end of the lanyard, and another spring adjacent an opposite end of the lanyard.

4. The process of claim 1, wherein the combining is carried out such that the replaceable battery compartment being unlockable by a magnetic field.

5. The process of claim 1, wherein the combining is carried out with the lock mechanism including a first lock for the pin or an end of the lanyard, a second lock for another end of the lanyard, and a third lock for the replaceable battery compartment.

6. The process of claim 1, wherein the combining is carried out with the lock mechanism including an arm movable so as to secure and unsecure an end of the lanyard.

7. The process of claim 1, wherein the combining is carried out with the lock mechanism including a lanyard pin drawer that locks a battery cover of the replaceable battery compartment.

8. The process of claim 1, wherein the combining is carried out with the replaceable battery compartment configured such that when a battery is in the replaceable battery compartment, and the battery has a plastic tab that separates the circuitry from at least one of an anode and a cathode of the battery, and an opening allows the plastic tab to extend out of the replaceable battery compartment sufficient that when the replaceable battery compartment is locked, the plastic tab can be pulled to unseparate the battery from the circuitry and thereby arm the circuitry to commence detecting the locked state.

9. The process of claim 1, wherein the combining is carried out with the lanyard being a first lanyard that has a length, and wherein the accessories include another lanyard of a different length than the length of the first lanyard.

10. The process of claim 1, further including providing the lanyard.

11. The process of claim 1, further including providing the lanyard and the pin.

12. The process of claim 1, further including providing the lanyard in packaging with the housing.

13. The process claim 1, further including associating the lanyard with the housing.

14. The process of claim 1, wherein the combining is carried out with the housing including a top and, under the top, a lanyard pin drawer comprising a lanyard hole and a mandrill hole, the lanyard pin drawer slideably locatable with respect to the top, such that when the pin or a pin end of the lanyard is inserted through the mandrill hole of the top and an end of the lanyard pin drawer, the lanyard pin drawer is held in a fixed or locked position, while another end of the lanyard pin drawer accommodates an opposite end of the lanyard, allowing electricity to enter the lanyard, traverse the lanyard, and emerge via a lock of the lock mechanism to a printed circuit board.

15. The process of claim 1, wherein the combining is carried out with a lanyard pin drawer comprising a lanyard hole and a mandrill hole, the lanyard pin drawer slideably locatable with respect to a top, such that when the pin is inserted through the mandrill hole of the top and an end of the lanyard pin drawer, the lanyard pin drawer is held in a fixed or locked position, while an other end of the lanyard pin drawer accommodates the opposite end of the lanyard, allowing electricity to enter the lanyard, traverse the lanyard, and emerge via a lock of the lock mechanism to a printed circuit board.

16. The process of claim 1, wherein the combining is carried out with the battery cover marking pointing to a lock position and an arm or notch in a battery cover mating with a protuberance of a lanyard pin drawer when the lanyard pin drawer is withdrawn into the housing, thereby securing the battery cover from opening.

17. A product produced by the process of any one of claims 1-16.

18. A process of using a product, the process including:
arming circuitry that detects a locked state, the circuitry in housing collectively structured to combine with one of a plurality of interchangeable accessories, the accessories including a pin and a lanyard, the housing including a replaceable battery compartment that is locked by inserting either the pin or the lanyard into a lock mechanism that differently secures the pin and the lanyard, the circuitry including a wireless receiver that disarms the locked state responsive to a received wireless signal and further includes an alarm triggered by an undisarmed breach of the locked state; and
inserting either the pin or the lanyard into a lock mechanism.

19. The process of claim 18, wherein the lanyard is inserted, and the arming is carried out such that the lanyard electrically communicates with the circuitry and conducts a signal to a conductive heading part of the lanyard, through to another end of lanyard to connect to the lock mechanism, then through the lock mechanism and a lock spring to the circuitry, and completes a circuit and such that, when not in the undisarmed state, cutting the lanyard or separating the lanyard from the circuitry, or disrupting the lock state will cause the alarm to alarm.

20. The process of claim 19, further including:
disarming the circuitry by employing a wireless decoder in the circuitry to turn off the alarm, disarm the circuitry, enable a standby mode or any combination thereof.

21. The process of claim 18, wherein the pin is inserted, and the arming is carried out such that the circuitry conducts a signal to a signal transfer spring by a switch spring that conducts to the lock mechanism by the pin that sends the signal back to the circuitry by the lock spring, and such that when not in the undisarmed state, separating the pin from the circuitry or disrupting the lock state will cause the alarm to alarm.

22. The process of claim 21, further including:
disarming the circuitry by employing a wireless decoder in the circuitry to turn off the alarm, disarm the circuitry, enable a standby mode, or any combination thereof.

* * * * *